United States Patent [19]
Brzezicki et al.

[11] Patent Number: 5,860,676
[45] Date of Patent: Jan. 19, 1999

[54] MODULAR BLOCK ASSEMBLY USING ANGLED FASTENERS FOR INTERCONNECTING FLUID COMPONENTS

[75] Inventors: Joseph M. Brzezicki, Chesterland; Thomas E. DiBiase, Mentor; Michael J. Mohlenkamp, University Heights; Benjamin J. Olechnowicz, Cuyahoga Falls; Richard T. Papa, South Euclid; Brian K. Sprafka, Euclid; Daniel E. Zeiler, Willoughby, all of Ohio

[73] Assignee: Swagelok Marketing Co., Cleveland, Ohio

[21] Appl. No.: 874,601

[22] Filed: Jun. 13, 1997

[51] Int. Cl.$^6$ .................................................... F16L 39/00
[52] U.S. Cl. .......................... 285/24; 285/125.1; 285/26; 137/884
[58] Field of Search ................... 285/125.1, 24, 285/132, 25, 26, 27, 28, 29; 137/884

[56] References Cited

U.S. PATENT DOCUMENTS

| | | | |
|---|---|---|---|
| 2,834,368 | 5/1958 | Gray | 137/884 |
| 3,219,053 | 11/1965 | Hupp | 285/125.1 X |
| 3,521,910 | 7/1970 | Callahan, Jr. et al. | |
| 3,570,534 | 3/1971 | Beavers | 285/125.1 X |
| 4,269,212 | 5/1981 | Kaartinen | 137/884 |
| 4,934,411 | 6/1990 | Albrecht | 285/125.1 X |
| 5,769,110 | 6/1998 | Ohmi et al. | 137/884 |

FOREIGN PATENT DOCUMENTS

| | | |
|---|---|---|
| 79 23 630 | 12/1979 | Germany. |
| 30 01 108 | 1/1980 | Germany. |
| 578 688 | of 1974 | Switzerland. |

OTHER PUBLICATIONS

Notification of Transmittal of International Search Report Sep. 18, 1998 (3 Pages).
International Search Report Sep. 18, 1998 (4 pages).

*Primary Examiner*—Dave W. Arola
*Attorney, Agent, or Firm*—Calfee, Halter & Griswold LLP

[57] ABSTRACT

A modular block assembly is provided for interconnecting fluid components of a fluid system in a reduced area. The system includes a base block having angularly disposed passages that receive fasteners in opposite, parallel end faces of the block. The fasteners allow adjacent base blocks to be connected in end-to-end fashion. The first passage extends through one of the end faces and communicates with an upper face of the block. Fluid components are selectively secured to the upper face of the base block to control or regulate fluid flow through the system as desired. Additional angle openings and fasteners, as well as additional fluid passages, may be provided in side wall faces of the base blocks. These additional passages permit transfer of fluid from one adjacent flow line to another. Each fluid passage end includes face seals allowing abutting engagement between the modular components to provide a sealed, continuous flow passage.

19 Claims, 5 Drawing Sheets

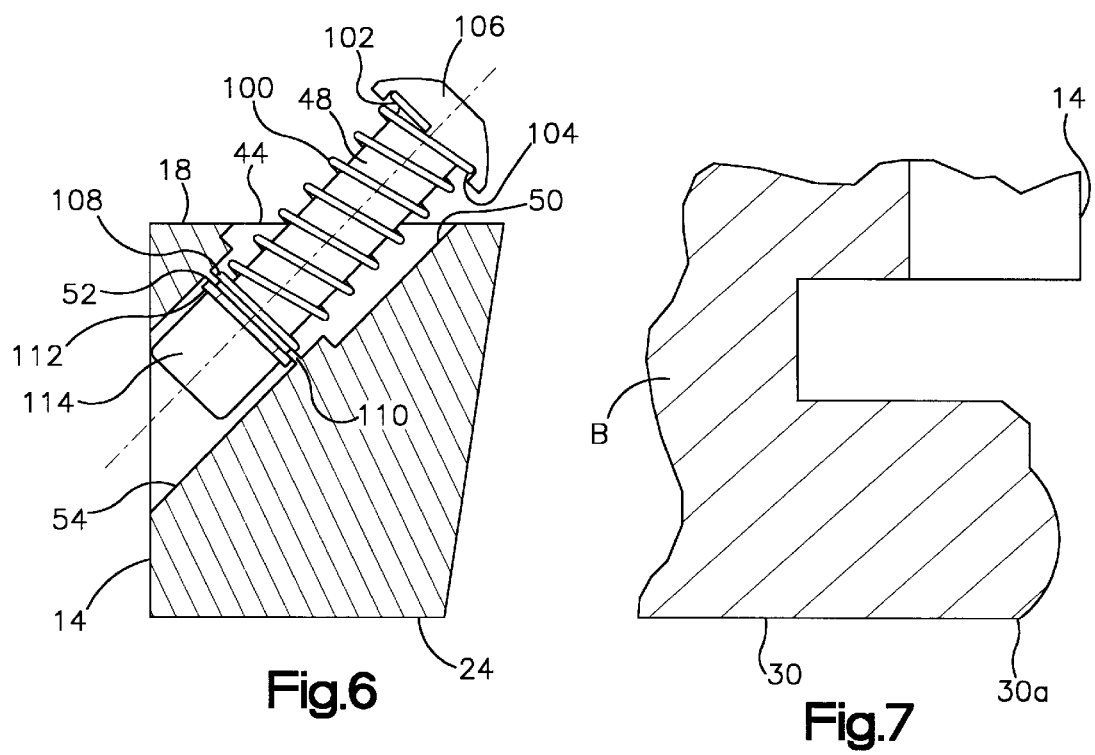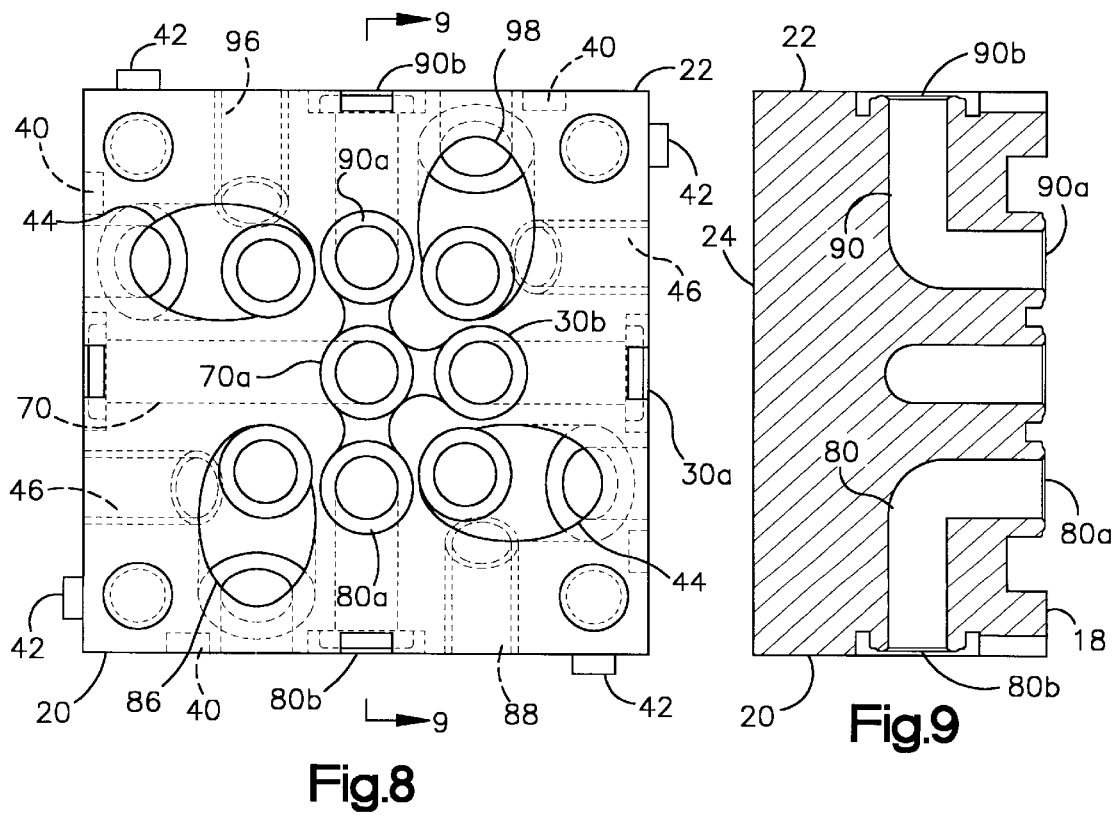

MODULAR BLOCK ASSEMBLY USING ANGLED FASTENERS FOR INTERCONNECTING FLUID COMPONENTS

BACKGROUND OF THE INVENTION

This invention pertains to the art of fluid environments and more particularly to high purity fluid systems, for example, such as the clean room environment used to manufacture semiconductor wafers. However, the invention is also applicable to related environments where extreme conditions are encountered such as high temperatures, pressures, vacuum, cryogenic, or corrosive conditions.

Gas panels used in the semiconductor industry include one or more flow lines or flow paths in which are arranged fluid components such as pressure regulators, valves, mass flow controllers, check valves, and the like. Each of these fluid components is interconnected by fluid lines or tubes via fittings. For example, a commercially successful fitting used to interconnect fluid components in conventional gas panels is shown and described in U.S. Pat. No. 3,521,910—Callahan, Jr., et al., the contents of which are incorporated herein by reference.

A serially arranged set of regulators, valves, flow controllers, check valves, and the like are often referred to as a "stick." Each of the components in the stick is connected to an adjacent component so that the tubes and fittings contribute substantially to the overall length of the stick. There exists a need in the industry for reducing the dimensions of the fluid system and fitting manufacturers are seeking to provide a system that has a reduced envelope or footprint, yet still achieves the performance, integrity and reliability of existing systems.

Adjacent sticks essentially proceed in parallel fashion to one another and are interconnected by a transfer lines. The transfer line extends perpendicular to a stick to establish fluid communication from one stick to another. Again, tubing and fittings are associated with the transfer line to allow fluid communication between the sticks. Thus, where space is at a premium, there exists an additional need to reduce the size of the transfer line.

Aside from the issues of dimensional constraints, if problems occur in one portion of the fluid system, a typical solution is to remove an entire stick. This is an extremely costly procedure that the industry would like to eliminate. There are additional concerns of maintaining ease of installation and maintenance, as well as cost reduction, associated with alternative fluid system proposals.

Still another primary concern in the high purity environment is eliminating dead space. Dead space is generally defined as regions where contaminants can reside without being effectively flushed from a system during a purge cycle. In environments where contaminants are measured in parts per million, dead space is of utmost concern.

Although modular fluid systems have been proposed, these developments suffer from one or more of deficiencies. First, not every fluid system has the same piping schematic. Thus, interchangeability of the components and the ability to accommodate different layouts must be addressed.

In an effort to provide a limited number of modular components, some manufacturers have proposed arrangements that fail to adequately consider dead space concerns. Still other arrangements are difficult to service since elongated portions require multiple components to be disassembled, even though only one of the components may require maintenance or replacement. This unnecessarily affects all of the seals between adjacent components and limits the ability to customize the positioning and layout of the fluid components in the system. Still other systems use blocks that have extremely complicated, and thus expensive, machined flow paths.

Accordingly, it is desired to provide an economical, compact fluid system arrangement that can be easily installed, maintained, and serviced. The arrangement must also be capable of customizing the fluid components to meet the needs of the manufacturer. Moreover, of extreme importance, is the elimination of dead space irrespective of the fluid system design.

SUMMARY OF THE INVENTION

The present invention contemplates a new and improved weldless fluid system for use in a high purity environment that overcomes all of the above referenced problems and others and provides a compact, modular, and reliable arrangement.

In accordance with the subject invention, a modular block assembly is provided for interconnecting fluid components of a fluid system in a reduced area. The system includes a base block having angularly disposed openings that receive fasteners that connect adjacent base blocks in end-to-end fashion.

According to another aspect of the invention, a first passage extends through an end face of the base block and communicates with an upper face of the base block. A fluid component is secured to the upper face of the base block to control or regulate fluid flow through the system as desired.

According to still another aspect of the invention, cooperating pin and recess pairs are provided in abutting faces of adjacent base blocks to relieve torque associated with make-up of the assembly using the fasteners through the angle openings.

According to still another aspect of the invention, additional angle openings and fasteners, as well as additional fluid passages, may be provided in side wall faces of the base blocks. These additional passages permit transfer of fluid from one adjacent flow line to another.

A principal advantage of the invention is found in the compact arrangement of fluid components.

Another advantage of the invention relates in the modularity of the base blocks that permit the assembly of a wide array of piping schematics.

Yet another advantage of the invention resides in the low dead space associated with this assembly.

Still other benefits and advantages will become apparent to those skilled in the art upon reading and understanding the following detailed description.

BRIEF DESCRIPTION OF THE DRAWINGS

A preferred embodiment of the invention will be described in detail and illustrated in the accompanying drawings in which:

FIG. 6 is an enlarged cross-sectional view taken generally along the lines 6—6 of FIG. 4 and showing an angle fastener received in the base block;

FIG. 7 is an enlarged detailed view of the encircled area of FIG. 5;

FIG. 8 is a top plan view of a base block similar to that shown in FIG. 4 but including additional flow passages therein; and FIG. 9 is a cross-sectional view taken generally along the lines 9—9 of FIG. 8.

DETAILED DESCRIPTION OF THE PREFERRED EMBODIMENT

With reference to the drawings which illustrate the preferred embodiment of the invention only, and are not intended to limit the invention, the Figures show a fluid system A comprised of base blocks B and fluid components C secured together in a modular arrangement.

Figure 1:
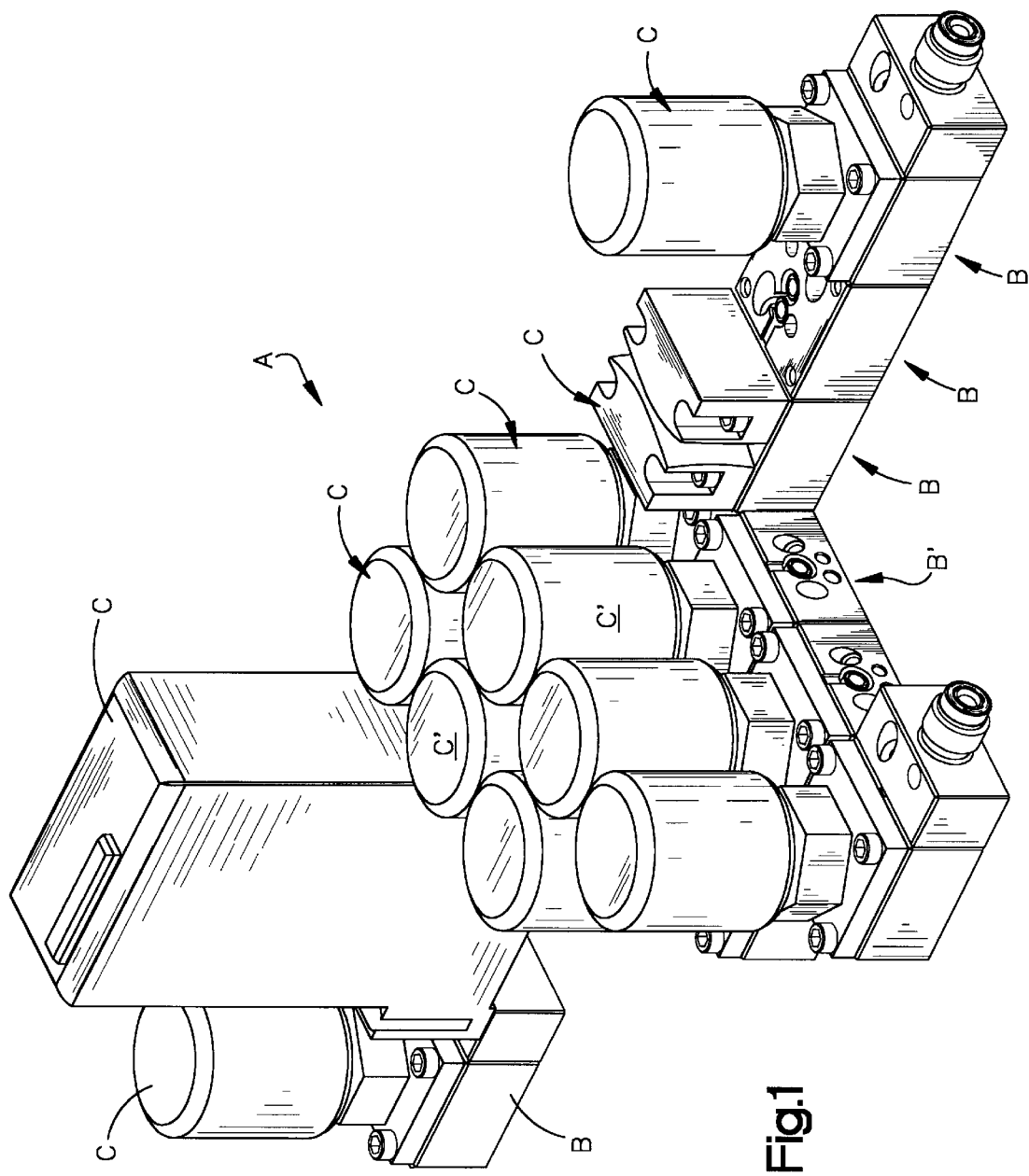
FIG. 1 is a perspective view of a modular fluid system formed in accordance with the teachings of the subject invention.
Figure 2:
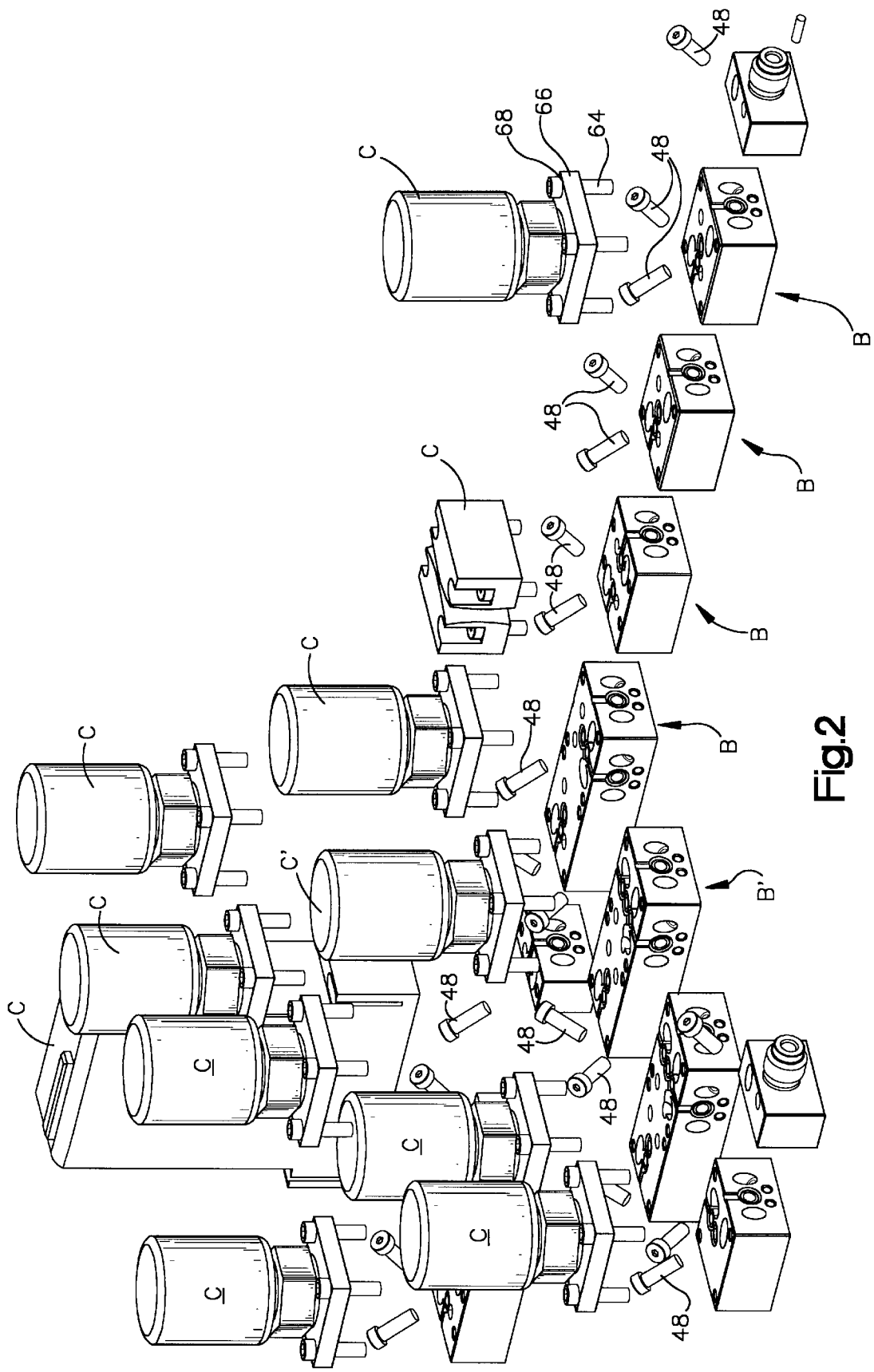
FIG. 2 is an exploded perspective view of the fluid system illustrated in FIG. 1.

More particularly, FIGS. 1 and 2 show a series of individual base blocks B, B', B", etc., assembled together to form a serial flow line, as well as providing a transfer path to a fluid component C'. Each base block B is of identical construction unless noted to the contrary and is preferably a unitary, substantially cube-shaped integral member having six planar faces. The base blocks, particularly shown in detail in FIGS. 3 and 4 and identified as B, have three faces in which passages are formed. The first and second faces are defined 14, 16 (which are shown in vertical orientation) and an upper or third face 18 (which is oriented horizontally) that is perpendicular to the first and second faces all include fluid passages that communicate therewith. The remaining faces of the base block include parallel fourth and fifth faces or sidewalls 20, 22, and a planar sixth face or bottom wall 24. As will be described further below, other faces may include additional openings communicating with additional fluid passages to create a modular fluid system adapted to meet a wide array of piping schematics. Moreover, each face is preferably rectilinear for mating engagement with abutting faces of adjacent base blocks as will be described in greater detail below.

The end face 14, shown oriented in the vertical direction, includes a centrally disposed opening 30a defining a first or inlet end of a fluid passage 30. The first end of the passage preferably communicates in a generally perpendicular direction with the end face 14. A second or outlet end 30b of the passage communicates in a generally perpendicular fashion with the third face 18. Each end of the fluid passage includes a face seal. The face seal of one base block is adapted to cooperate with a face seal of an adjacent base block to form a continuous flow passage when abutting base blocks are joined together.

Preferably, and for ease of machining, the passage has a generally L-shaped configuration (FIG. 5), and as indicated above, the opening is substantially centered within the first end face of the base block. The second end 30b of the passage is slightly offset from the center of the third face 18, the reasons for which will become more apparent below.

The first face also includes means for eliminating torque between adjacent base blocks when they are assembled together. Particularly, the torque eliminating means is defined by a recess 40 and pin 42, preferably disposed in symmetrical relation about a central y-axis defined in the first face. The pin 42 from the face of one base block is received in the recess 40 of a mating face of an adjacent block.

Also provided in the first face are a pair of openings 44, 46 that define part of means for securing the blocks together. Particularly, the preferred securing means is a fastener such as the illustrated angle bolt 48 that extends through the opening. The openings 44 extend at an angle from the upper face 18 to the first face 14, or to the second end face 16. Preferably the angle openings 44 are diagonally disposed relative to one another in the upper face 18. Moreover, the first angle opening 44 proceeds at an acute angle relative to the upper face 18 for communication with the first end face.

Each angled passage includes an enlarged counterbore section 50 (FIG. 6) that extends inwardly from the upper face 18. A reduced diameter portion 52 then proceeds from the enlarged counterbore into a second counterbore 54 that proceeds to either the first or second face 14, 16 of the base block. Thus, a fastener, for example angle bolt 48, is received through each angle opening in the upper face of the base block.

A threaded end 114 of the angle bolt proceeds through the opening 54 for receipt in a similar angle recess 46 in an end face of the next adjacent block. The recess 46 is preferably threaded so that rotation of the fastener draws the abutting faces of the adjacent base blocks together into sealing engagement. Likewise, an angle bolt from the adjacent base block extends through the angle opening 44 in the upper face, through its second end face 16, and is received in the recess 46 in first end face of the first base block.

As will be appreciated, the recesses 40 and pins 42 align adjacent base blocks together during the assembly process and eliminate torque associated with the diagonal relationship of the angle bolts. The recesses and pins align the angle opening 44 in the first base block in mating relation with the recess 46 in the adjacent base block. Since a cooperating pair of angle bolts in adjacent base blocks act through a vertical interface or plane and on opposite sides of the fluid passages communicating with the end faces, the torque is counteracted by the recess and pin arrangement 40, 42 so that the make-up forces are generally constrained to an axial direction.

Figure 3:
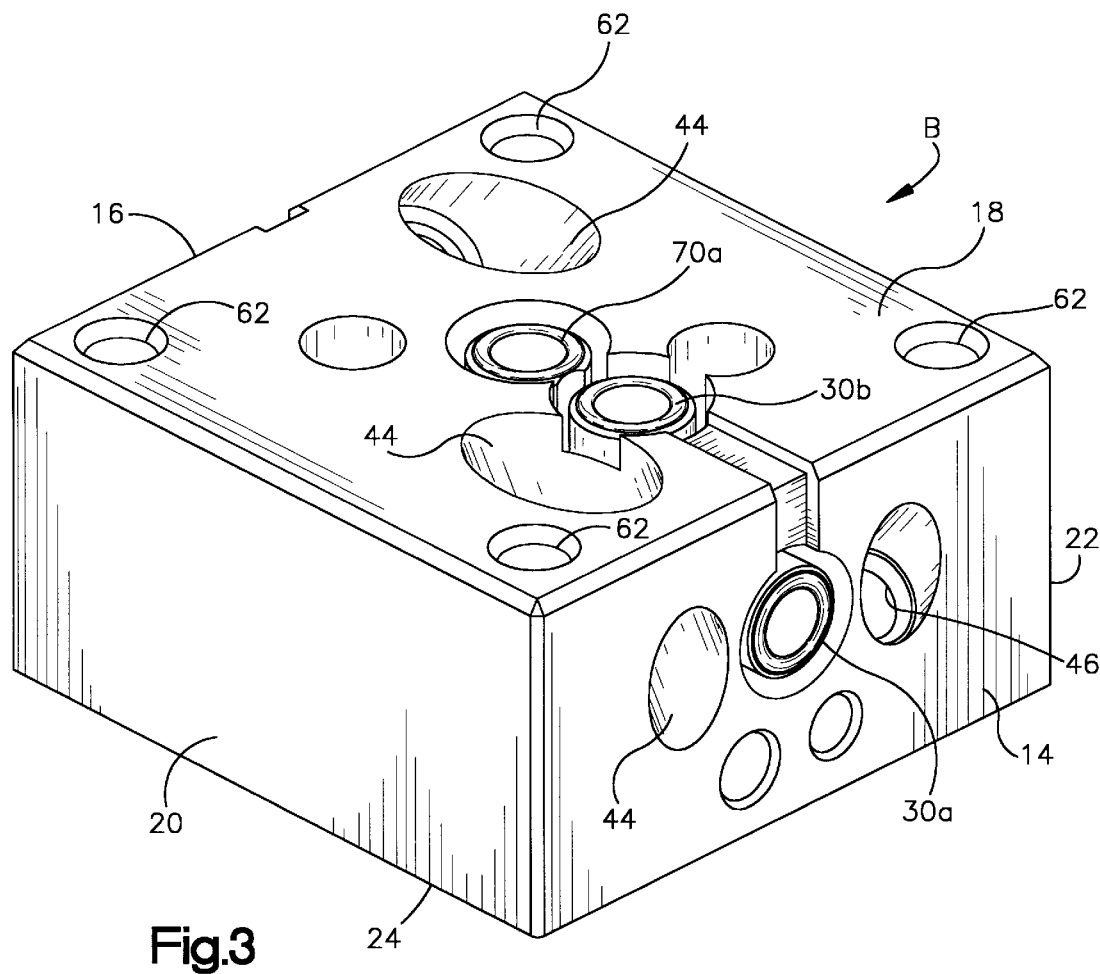
FIG. 3 is an enlarged perspective view of a preferred form of base block formed in accordance with the teachings of the present invention.
Figure 4:
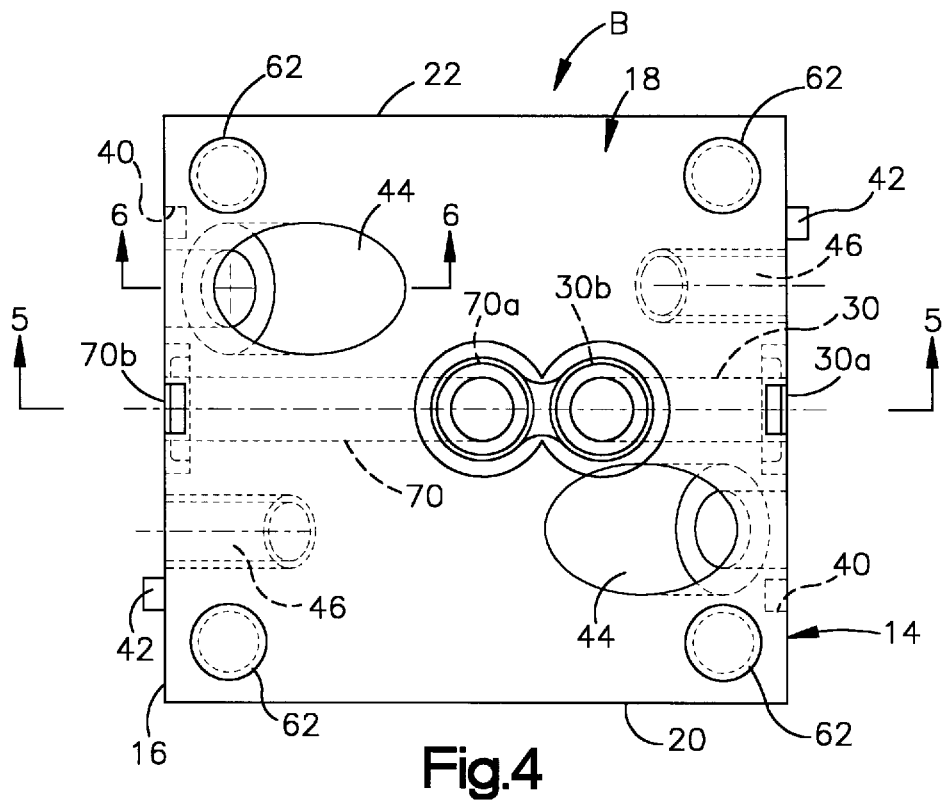
FIG. 4 is a top plan view of a base block formed in accordance with the subject invention.

As best illustrated in FIGS. 2–4, the upper face 18 includes four perimeter recesses 62 disposed in the corners. The recesses 62 are preferably threaded and adapted to receive fasteners 64 associated with the fluid components C (FIG. 2). As shown in FIGS. 1 and 2, each fluid component preferably includes a planar rectangular or square base 66 that conforms to the dimensions of the upper face of the base block. The fasteners 64 extend through openings 68 in the perimeter of the fluid component base for threaded receipt in the recesses 62 of the base block. This sealingly secures the fluid component to a respective base block B. Moreover, by locating the recesses 62 in the corners, they do not interfere with the numerous passageways, angle openings and recess/pin pairs in the base block as described above.

Figure 5:
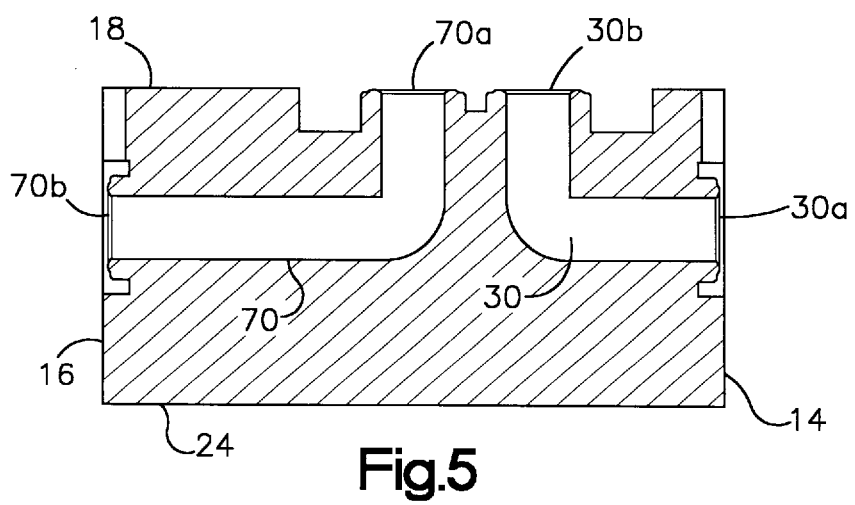
FIG. 5 is a cross-sectional view taken generally along the lines 5—5 of FIG. 4.

A second passage 70 is also provided in base block B. A first or inlet end 70a of the passage extends through the upper face 18 of the block while a second or outlet end 70b of the passage is disposed in a central location in the end face 16 (FIGS. 4–5). Again, and for ease of machining, the second passage preferably has an L-shaped configuration (FIG. 5). Thus, the passage ends 70a, 30b are intended to communicate with an inlet and outlet associated with a fluid component base 66 secured to the upper face of the base block. This permits fluid that enters passage 70 to proceed through the fluid component and ultimately continue in a general axial direction into the passage 30. Thus, as will be appreciated, a serial arrangement of the base blocks B in end-to-end fashion forms a stick.

The modular arrangement of the fluid system members allows different fluid components to be secured to the upper face 18 of adjacent base blocks. Thus, a valve, flow controller, regulator, etc. may be joined to selected base blocks to satisfy various piping schematics.

To this juncture, the base blocks have been described with reference to conveying flow in a single axial direction, i.e., along the stick. It is also contemplated that additional flow passages may be desired at right angles, i.e., through the parallel side walls 20, 22 of the base block. The symmetrical arrangement of the fluid passages, angle openings, pins, recesses, etc., described above easily incorporates additional flow passages and angle connections into a base block to achieve this goal.

Specifically, if it is desired to provide fluid communication through side wall 20, a pin and recess 40, 42 are provided in the side wall (FIG. 8). Moreover, an additional fluid passage 80 has a first or inlet end 8a that is disposed adjacent the centrally located second passage inlet end 70a in the upper face. The inlet end receives fluid from the fluid component that is secured to the upper surface of the base block. Likewise, a second or outlet end 80b of the third fluid passage is centrally located in the side wall 20. Like all of the other fluid passages in the base block, the ends thereof include a face seal to allow abutting base blocks to form a continuous sealed fluid path, here in a transverse direction to the stick. It is also necessary to include an angle opening 86 and associated angle bolt that proceed from the upper face to the side wall 20 and, in addition, a recess 88 is formed in the side wall to receive an angle bolt from an adjacent base block.

The same description is generally applicable to side wall 22. Thus, it includes a fourth fluid passage 90 having a first or inlet end 90a that communicates with the upper face 18. A second end 90b enters in a generally perpendicular direction to the side wall 22. A recess and pin 40, 42 are provided in the side wall face 22. Disposed intermediate the passage and the recess is an angle opening 98 and angle bolt that extend from the upper face 18 into communication with the side wall face 22 and an angle recess 96 that extends inwardly from the face 22.

AS will be appreciated, selectively incorporating base blocks that include these additional passages that extend through either or both side walls 20, 22 allows an effective transfer path to be established between adjacent sticks. As shown in FIGS. 1 and 2, base blocks B' and B" include the additional openings in the side wall faces. This allows fluid that generally extends in an axial direction, i.e., from base block B to base block B', to proceed in a perpendicular direction, i.e., from base block B' to base block B". This transverse path can continue as provided in side wall 22 of base block B". Moreover, a second stick extending parallel to the first stick may be provided by joining adjacent base blocks and associated fluid components to the first and third faces 14, 16, respectively of base block B".

As shown in FIG. 6, each angle bolt 48 is preferably retained with the base block, particularly in its associated angle opening. This facilitates retention and inventory of parts, and also provides for ease of assembling adjacent base blocks. A light gauge spring 100 surrounds an unthreaded shank portion of the angle bolt. A first end 102 of the spring is received within a groove 104 of cap 106 of the angle bolt. A second end 108 of the spring abuttingly engages the shoulder 110 defined between the counterbore and reduced diameter region of the angle opening. Thus, the angle bolt is urged outwardly from its respective opening by the biasing force of the spring. A washer 112 is received over the threads 114 of the angle bolt and cooperates with the opposite face of the shoulder 110. Thus, the washer serves as a stop member to prevent the bolt from being removed from its associated opening.

It will be understood that the spring is a light gauge material that can be fully compressed and received within the counterbore 50 of an angle opening. Thus, the spring will not impede or interfere with the interconnection of adjacent base blocks.

The invention has been described with reference to the preferred embodiment. Obviously, modifications and alterations will occur to others upon a reading and understanding of this specification. For example, different fasteners can be used or located in different positions without departing from the overall intent of the invention. Moreover, a base block may adopt dimensions other than the 1.5"×1.5" upper face configuration in the preferred embodiment. This dimension is extremely compact and yet all of the necessary fluid passages are contained therein to provide a versatile modular arrangement that meets the needs of the industry. The invention is intended to include all such modifications and alterations insofar as they come within the scope of the appended claims or the equivalents thereof.

Having thus described the invention, it is now claimed:

1. A weldless fluid system used in high purity environments, a modular block assembly for interconnecting fluid components in a compact area:

a unitary base block having a substantially cubical shape in which is provided a first passage that extends from a first face of the block and terminating before reaching a parallel second face, and communicating with a third face that is perpendicular to the first and second faces; and an angle opening extending from the third face to the first face and receiving a fastener therein, and a recess in the first face adapted to receive a fastener from an adjacent base block upon assembly of one base block to another along the first face.

2. The modular base block assembly as defined in claim 1 further comprising means for eliminating torsion between adjacent base blocks upon make-up.

3. The modular base block assembly as defined in claim 2 wherein the torsion eliminating means includes a pin and a recess arranged so that the pin from a first base block is received in the recess of the adjacent base block and the pin from the adjacent base block is received in the recess of the first base block.

4. The modular base block assembly as defined in claim 1 further comprising a second passage that extends from the third face of the base block to the second face of the base block.

5. The modular base block assembly as defined in claim 4 further comprising an angle opening extending from the third face to the second face and receiving a fastener therein, and a recess in the second face adapted to receive a fastener from an adjacent base block upon assembly of one base block to another along the second face.

6. The modular base block assembly as defined in claim 4 further comprising a third passage that extends from the third face of the base block to a fourth face of the base block that is perpendicular to the first and third faces.

7. The modular base block assembly as defined in claim 6 further comprising an angle opening extending from the third face to the fourth face and receiving a fastener therein, and a recess in the fourth face adapted to receive a fastener from an adjacent base block upon assembly of one base block to another along the fourth face.

8. The modular base block assembly as defined in claim 1 further comprising a face seal at first and second ends of the first passage for sealing engagement with an adjacent base block along the first face of the base block and a fluid component received on the third face of the base block.

9. The modular base block assembly as defined in claim 1 wherein the angle opening includes a shoulder for receiving a spring that urges the fastener outwardly therefrom.

10. The modular base block assembly as defined in claim 1 wherein a first end of a second passage is centrally located in the third face of the base block, first and second angle openings being disposed on diagonally opposite sides of the second passage first end, extending toward parallel respective first and second faces of the base block.

11. The modular base block assembly as defined in claim 10 further comprising recesses adapted to receive fluid component fasteners in corners of the third face of the base block and selectively securing the fluid component thereto.

12. A modular base block assembly for a weldless fluid system of a high purity environment, the assembly comprising:

a unitary substantially cubical base block having six rectangular faces, parallel first and second end faces and parallel first and second side wall faces being similarly dimensioned for selective abutting relation with a substantially identical adjacent base block, the base block having a first passage with a first end that communicates with the first end face in a substantially central location and a second end that communicates with a third face that is perpendicular to the end and side wall faces; and angle openings extending from the third face to one of the end faces and receiving a fastener therethrough, and a recess extending angularly into the said one end face for receiving a fastener from an adjacent base block disposed along the said end face.

13. The modular block assembly as defined in claim 12 further comprising a pin and a recess formed in the said one end face for operative cooperation with an associated recess and pin, respectively, of an adjacent base block to eliminated torsion associated with make-up of the abutting base blocks as the fasteners are tightened.

14. The modular block assembly as defined in claim 12 further comprising a second fluid passage having a first end communicating with the third face and a second end communicating with the second end face.

15. The modular block assembly as defined in claim 14 wherein the angle openings are diagonally disposed in the third face on opposite sides of the first end of the second fluid passage.

16. The modular block assembly as defined in claim 14 further comprising a fluid component received on the third face for fluid communication with second end of the first fluid passage and the first end of the second fluid passage.

17. The modular block assembly as defined in claim 16 further comprising recesses disposed in corners of the third face for receiving fasteners that secure the fluid component to the base block.

18. The modular block assembly as defined in claim 14 further comprising a third fluid passage having a first end that communicates with the third face and a second end that communicates with one of the side wall faces.

19. The modular block assembly as defined in claim 18 further comprising an angle opening extending from the third face to said one side wall and receiving a fastener therethrough and a recess extending angularly inward into the said one side wall and adapted to receive a fastener from an adjacent base block that abuts along the said one side wall.

* * * * *